United States Patent [19]  
Texier et al.

[11] 3,988,544  
[45] Oct. 26, 1976

[54] TIME-DIVISION SWITCHING NETWORK FOR SWITCHING MULTIFORMAT MULTIPLEXED DATA

[76] Inventors: Alain Texier, 32, Avenue du General De Gaulle, Meudon la Foret; Edgar L. Lapeyronnie, 139, Boulevard Maxime Gorki, Villejuif, both of France

[22] Filed: Dec. 29, 1975

[21] Appl. No.: 644,836

[30] Foreign Application Priority Data
Dec. 31, 1974 France .............................. 74.43512

[52] U.S. Cl. ...................... 179/15 BV; 179/15 AT  
[51] Int. Cl.² ......................................... H04Q 11/04  
[58] Field of Search ......... 179/15 BV, 15 BA, 15 A, 179/15 AT, 15 AQ; 178/50

[56] References Cited
UNITED STATES PATENTS

| | | | |
|---|---|---|---|
| 3,535,450 | 10/1970 | Vollmeyer | 178/50 |
| 3,794,768 | 2/1974 | Carney | 179/15 BV |
| 3,890,469 | 6/1975 | Kelly | 179/15 AQ |
| 3,894,189 | 7/1975 | Edstrom | 179/15 AT |
| 3,922,494 | 11/1975 | Cooper | 179/15 A |
| 3,952,162 | 4/1976 | Texier | 179/15 AT |

*Primary Examiner*—David L. Stewart  
*Attorney, Agent, or Firm*—Abraham A. Saffitz

[57] ABSTRACT

A time division digital switching network comprises first multiplexing means in which first-order digital data channels transmitting words which have a format selected amongst two formats and a first rate selected amongst a plurality of rates different from, but multiple of, one another undergo a first multiplexing converting them into a second-order digital data channel having a second predetermined rate. Each given second-order channel may comprise either a plurality of first order channels of one and the same rate or a combination of first-order channels having different rates. Thereafter there are provided second multiplexing means in which the second-order digital channels undergo a second multiplexing converting them into a third-order digital data channel having a third predetermined rate. In a digital switching unit having at least one buffer store, the first-order channel words multiplexed into the third-order channels are grouped at an address whose first part depends upon the second order channel they occupy in the third-order channel and whose second part is derived from the word number in a word multiframe. The bits of consecutive small format words form large-format words. As the small format words may undergo transposition in their sequential order during switching, means are provided for reconstituting the proper sequential order amongst the switched small format words.

4 Claims, 13 Drawing Figures

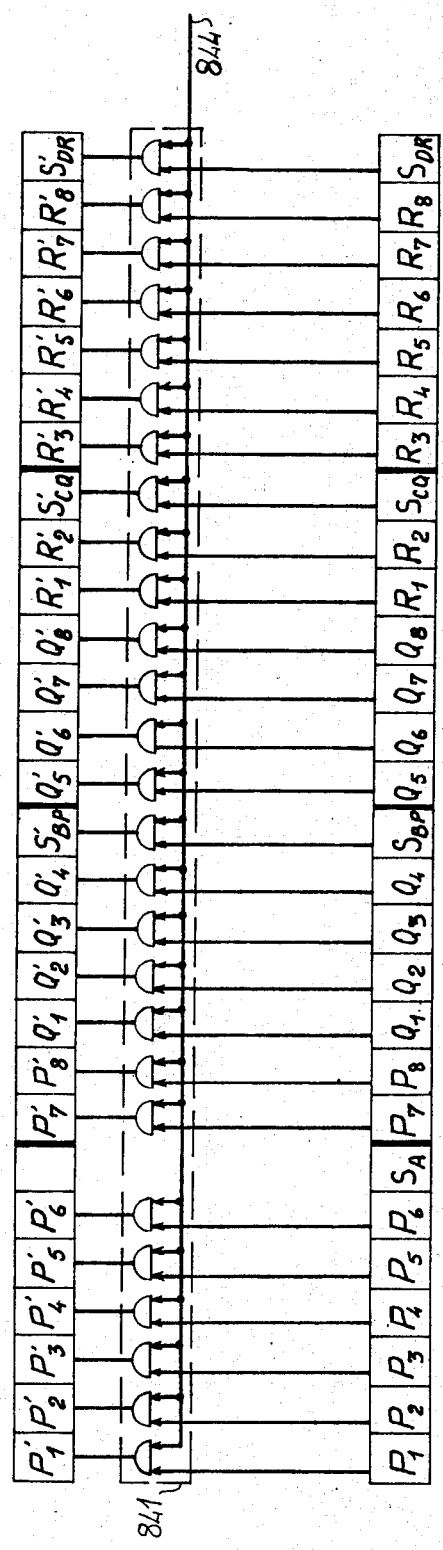
FIG.3₁

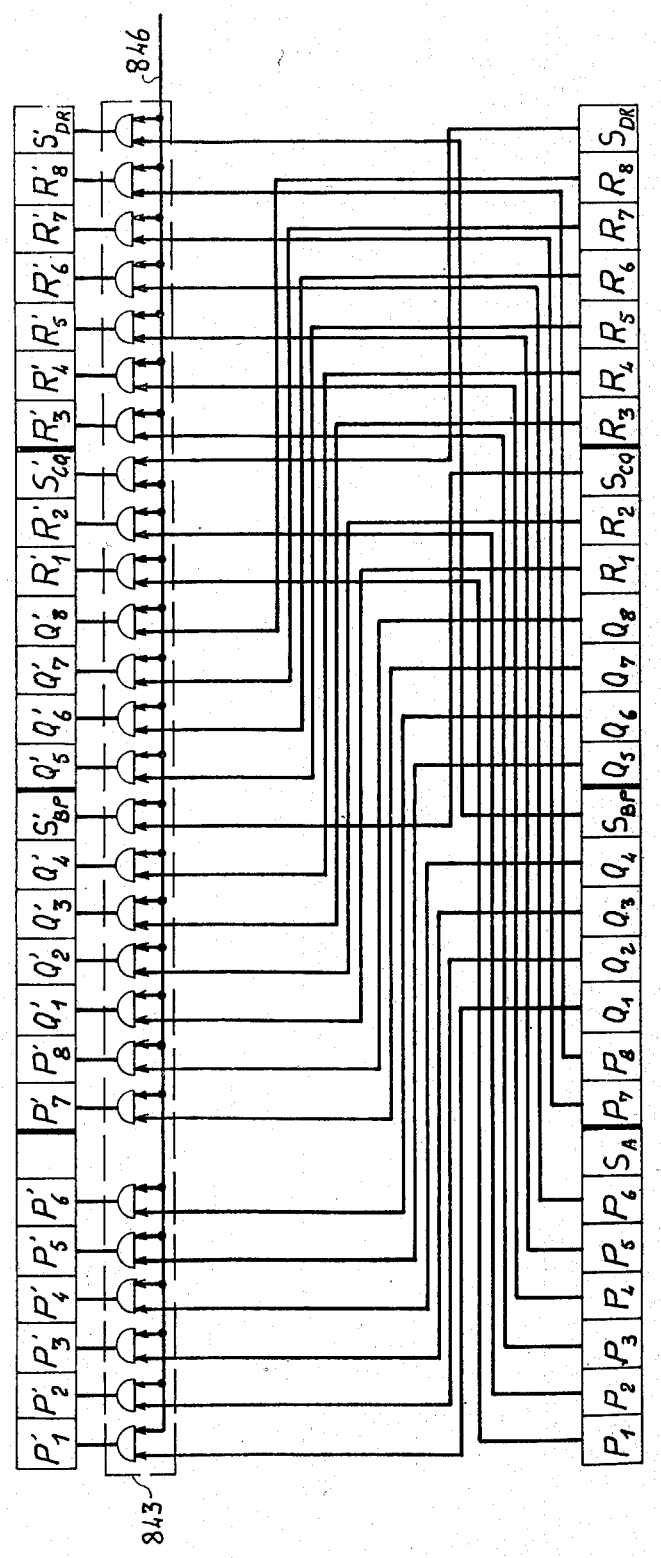
FIG.3₃

TIME-DIVISION SWITCHING NETWORK FOR SWITCHING MULTIFORMAT MULTIPLEXED DATA

BACKGROUND OF THE INVENTION

The present invention relates to a time-division digital switching network for switching time-multiplexed data arising from the time multiplexing of component data having different rates - i.e., multiplexed word per word at different recurrent periods or rates — different formats — i.e., the words to be multiplexed having different bit numbers.

DESCRIPTION OF THE PRIOR ART

Known are digital switching networks intended to switch third order digital channels at 2.048 Mbits/sec, resulting from the multiplexing of 32 second order digital channels at 64 kbits/sec, the latter channels resulting from the multiplexing of first order digital channels at 12.8, 3.2, or 0.8 kbits/sec. U.S. Pat. application Ser. No. 581,081 filed May 27, 1975 now U.S. Pat. No. 3,952,162, issued Apr. 20, 1976, has described a monorate multiplex digital switching network for switching data octets at different user rates of e.g. 9.6, 2.4 and 0.6 kbits/s. Since the octets consist of 1 framing sequence bit, 6 information bits and 1 status bit, there correspond to these binary user rates transmission-channel binary rates which are one-third higher - i.e., 12.8, 3.2 and 0.8 kbits/s, respectively.

A 64 kbits/s channel can be formed by multiplexing five 12.8 kbit/s channels or 20 3.2 kbit/s channels or 80 0.8 kbit/s channels, the 12.8 kbit/s channel repeating every fifth octet (5-octet frame), the 3.2 kbit/s channel repeating every 20th octet (20-octet frame) and the 800 bit/s channel repeating every 80th octet (80-octet frame). The lowest common multiple of the octet numbers of the various frames is 80 and this is the number taken to define the multiframe. The 80 octets forming a multiframe are detected by their first bits which form a pseudorandom multiframing sequence.

In the patent application above-mentioned Ser. No. 581,081, the octets of the first-order digital channels at the 12.8, 3.2 and 0.8 kbit/s rates are given a first time-multiplexing converting them into 64 kbit/s second-order digital channels, which are given a second time-multiplexing converting them into a 2.048 Mbit/s third order digital channel. The second-order channels are homogeneous or of the monorate kind — i.e., they arise from the multiplexing of a number of first-order channels having the same rate which can be 5 octets per frame or 20 octets per frame or 80 octets per frame.

U.S. Pat. application Ser. No. 645,237 filed Dec. 29, 1975 has described a multirate digital switching network in which each second order digital channel may result from the multiplexing of different-rate first order digital channels with the same channel. For instance, each second order digital channel may result from the multiplexing of $x$ component channels at 12.8 kbits/sec., of $y$ component channels at 3.2 kbits/sec, and of $z$ component channels at 0.8 kbit/sec. with the condition:

$$16x + 4y + z = 80$$

in order that the resulting multiplexed second order channel be at the rate of 64 kbits/sec. In this case, there are in a same second order digital channel octets recurring in five, octets recurring in twenty and octets recurring in eighty within a 80-octet multiframe. In these two Patent Applications, the octets to be switched comprise a first framing bit, six data bits and one status bit. The framing bits of the first-order channels define a locking pseudorandom multiframe.

SUMMARY OF THE PRESENT INVENTION

Digital envelope format or word format has not as yet been internationally standardized and in some countries the envelopes have a multiframe locking pseudorandom sequence, 8 data bits and one status bit. In order to match a 8-bit total envelope format with a 10-bit total envelope format, a quadri-octet structure was proposed. In 4 successive octets of the same first-order channel comprising a total of 32 bits, 3 envelopes were structured, each with 8 data bits. The envelope pseudorandom sequence bits are those of the octets. The envelope status bits are 3 of the octet status bits, the status bit of one of the octets remaining unused, or let us say that it is affected to a function without relation to the present invention.

In the above-indicated Patent applications Ser. No. 581,081, filed May 27, 1975 and Ser. No. 645,237, filed Dec. 29, 1975, and taking into account the examples given of first order component channel rates, equal respectively to the fifth, twentieth and eightieth of 64 kbits/sec., the multiframe is of 80 octets (lowest common multiple of 5, 20, and 80). The octets are entered into a buffer-memory with a write-in addres which includes 2 parts when multiplexing is a monorate multiplexing : (i) the number of the second order digital channel in the multiplexed third order digital channel (for instance 1 out of 256, that is a 8-bit address), and (ii) the number of the first order digital channel in the multiframe which is derived from the order of the octet in the multiframe. In effect, there are 80 octets in the multiframe; therefore, whether there are 5 channels, 20 channels or 80 first-order channels, in the multiframe, the first-order channel address is the remainder of the division of the octet address by 5, 20, or 80. When multiplexing is a multirate multiplexing, the first order channel address is derived from the octet address by means of a read-only memory giving the correspondence between each octet address and the address of the first order channel to which it pertains according to the multiplexing schedule.

The octets of a quadri-octet are locked in the multiframe, that is, from the start of a multiframe, we have an octet A, then an octet B, an octet C, and octet D and again an octet A and so on. But of course the multiframes of the second order channels contained in the incoming and outgoing third order channels are not synchronous. The result is that with a sequence of A,B,C,D, forming an incoming quadri-octet there corresponds one of the outgoing sequences A,B,C,D, or B,C,D,A or C,D,A,B or D,A,B,C. However, the outgoing quadri-octet must be an A,B,C,D quadri-octet just as the incoming quadri-octet. We can thus define from the start of an incoming multiframe phases $\phi A$, $\phi B$, $\phi C$, or $\phi D$, for the incoming quadri-octets and as well phases $\phi A'$, $\phi B'$, $\phi C'$ or $\phi D'$ for the outgoing quadri-octets. As the bits of the envelopes P,Q,R are distributed in a different manner in octets A,B,C,D, as 6 bits in an octet and 2 in the next, or as 4 bits in an octet and 4 in the next, or again as 2 bits in an octet and 6 in the next, it is necessary to re-arrange the envelope bits as a function of the phase correspondence between the incoming quadri-octets and the outgoing quadri-octets.

It is moreover required to read an envelope over 2 successive octets so as to dispatch the envelope content to the switching network control unit when the envelope is a signaling envelope (that is its status bit is a zero).

Re-arranging envelope bits in 6 + 2, 4 + 4, 2 + 6 is done by means of a bi-octet store and an envelope bit re-arrangement circuit. The bi-octet store is associated to a read out register and is used to read bi-octets in function of their phase.

BRIEF DESCRIPTION OF THE DRAWINGS

The invention will now be described in detail with reference to the accompanying drawings wherein:

Referring to FIG. 1, it shows a quadri-octet composed of 4 octets, A,B,C, and D, this quadri-octet being broken down into 3 envelopes, P,Q,R, each with 8 data bits, $P_1$ to $P_8$ for envelope P, $Q_1$ to $Q_8$ for envelope Q, $R_1$ to $R_8$ for envelope R. The status bits are $S_A$, $S_{BP}$, $S_{CQ}$, $S_{DR}$ for the octets, and $S_{BP}$, $S_{CQ}$, and $S_{DR}$ for the envelopes. We see that by not taking into account the bits F of the locking pseudorandom sequence, a P envelope has 6 data bits in its first octet A and 2 data bits in its second octet B, that a Q envelope has 4 data bits in its first octet B and 4 data bits in its second octet C, and that a R envelope, has 2 data bits in its first octet C and 6 data bits in its second octet D.

As has been stated in the foreword, the quadri-octets are multiframe locked and are endowed with an input phase $\phi_A$, $\phi_B$, $\phi_C$, $\phi_D$, and an output phase $\phi_A'$, $\phi_B'$, $\phi_C'$, $\phi_D'$. The result is that the miltiframe is 4 times longer than in the case of normal octet switching networks, 320 instead of 80 octets. Where $\phi_A = \phi_A'$, $\phi_B = \phi_B'$, $\phi_C = \phi_C'$, $\phi_D = \phi_D'$, there is no need to slide the envelope data of an octet into another.

Figures 1, 2:
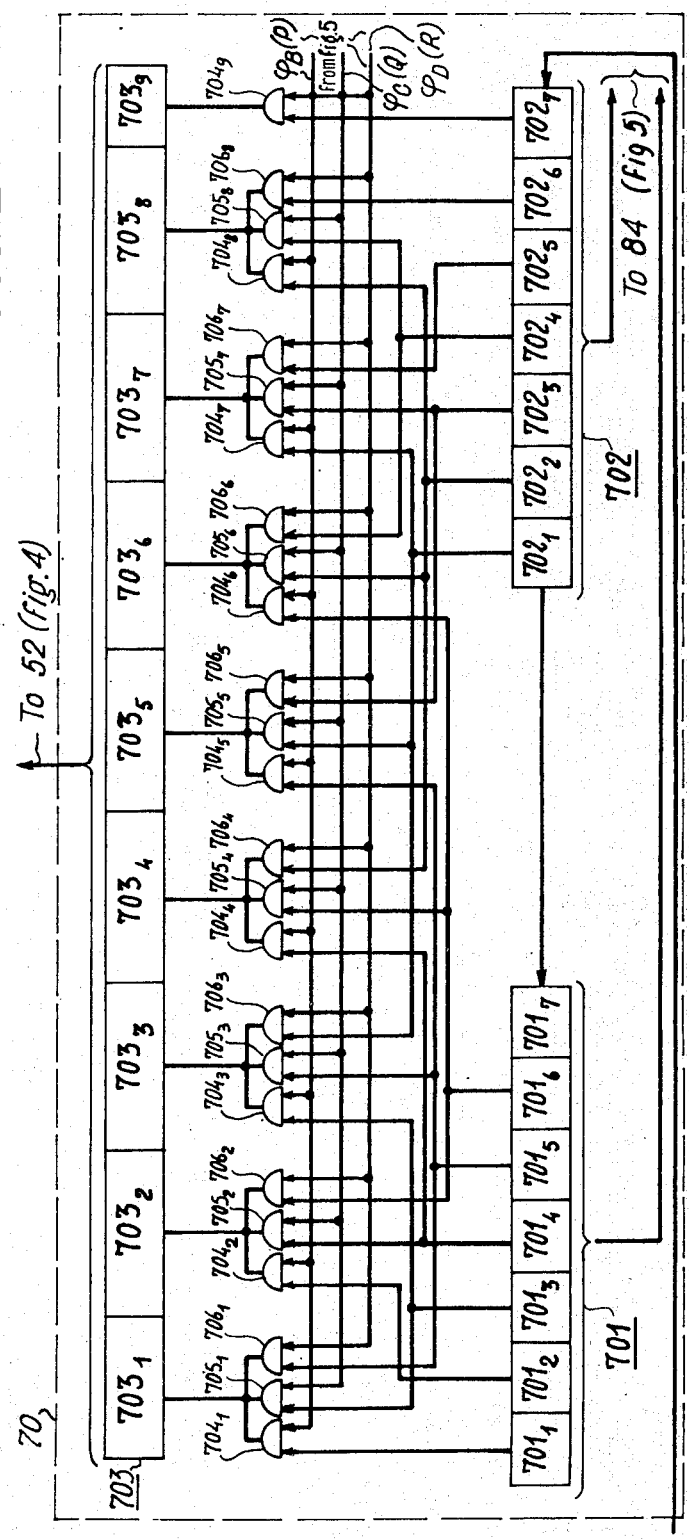
FIG. 1 depicts a quadri-octet.
FIG. 2 represents means for converting a bi-octet to an envelope in function of the phase of the second octet of the bi-octet FIGS. $3_1$, $3_2$, $3_3$ show the re-arrangement of the bi-octet bits as per compared phases between the second octet of the incoming bi-octet and the outgoing octet.
Figure 32:
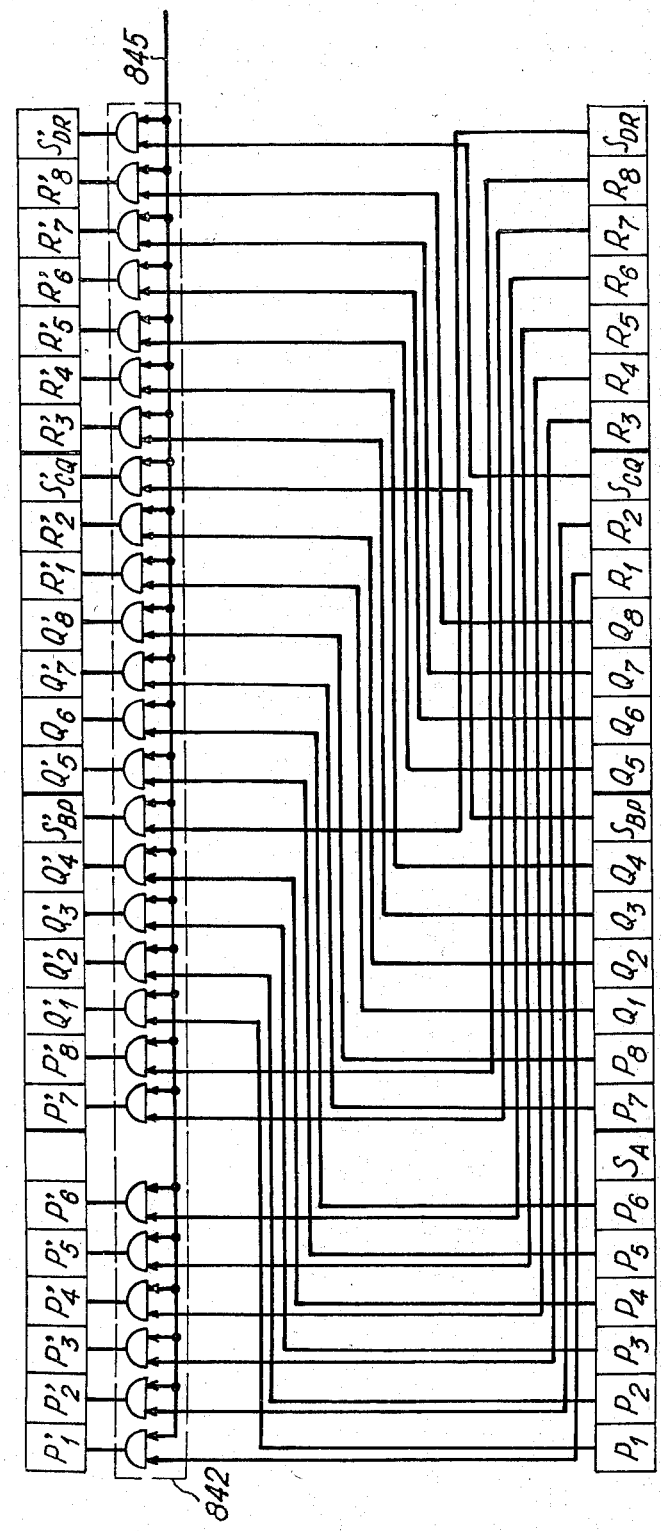

In FIG. 2, 2 octet write-in registers, 701 and 702, are shown each with seven flipflops, $701_1$ to $701_7$, and $702_1$ to $702_7$, and an envelope read-out register, 703 with 9 flipflops, $703_1$ to $703_9$, belonging to bi-octet buffer store 70. The 2 write-in registers are connected to the read-out register by means of 3 sets of 8 or 9 gates, $704_1$ to $704_9$, $705_1$ to $705_8$, $706_1$ to $706_8$. Gates $704_1$ to $704_9$ are open when the second octet of a bi-octet has the phase $\phi_B$ corresponding to envelope P read-out; gates $705_1$ to $705_8$ and $704_9$ are open when the second octet of a bi-octet has the phase $\phi_C$ corresponding to envelope Q read-out; gates $706_1$ to $706_8$ and $704_9$ are open when the second octet of a bi-octet has the phase $\phi_D$ corresponding to envelope R read-out. When registers 701 and 702 contain bi-octet DA, no gate is open. We see on FIG. 2 that an envelope P of type 6 + 2 and its status bit $S_{BP}$ are transferred through gates $704_1$ to $704_9$, that an envelope Q of type 4 + 4 and its status bit $S_{CQ}$ are transferred though gates $705_1$ to $705_8$ and $704_9$, and that an envelope R of type 2 + 6 and its status bit $S_{DR}$ are transferred through gates $706_1$ to $706_8$ and $704_9$.

To the sequence of incoming bi-octets AB, BC, CD, DA containing envelopes P of type 6 + 2, and R of type 2 + 6, respectively, can correspond the 4 sequences AB, BC, CD, DA; BC, CD, DA, AB; CD, DA, AB, BC; DA, AB, BC, CD of outgoing bi-octets. It is therefore necessary to re-arrange the envelope bits so that an outgoing AB bi-octet always contains an envelope P, an outgoing bi-octet BC always contains an envelope Q, and an outgoing bi-octet CD always contains an envelope R. As will be shown, a single incoming bi-octet, and not all the quadri-octet, enables to form an outgoing octet.

FIG. $3_1$ depicts the re-arrangement made between incoming bi-octets AB, BC, CD, DA, and outgoing octets A', B', C', D', or B', C', D', A'. The re-arrangement table is as follows:

| A | A' | B | B' | C | C' | D | D' |
|---|----|---|----|---|----|---|----|
| $P_1$ | $P_1'$ | $P_7$ | $P_7'$ | $Q_5$ | $Q_5'$ | $R_3$ | $R_3'$ |
| $P_2$ | $P_2'$ | $P_8$ | $P_8'$ | $Q_6$ | $Q_6'$ | $R_4$ | $R_4'$ |
| $P_3$ | $P_3'$ | $Q_1$ | $Q_1'$ | $Q_7$ | $Q_7'$ | $R_5$ | $R_5'$ |
| $P_4$ | $P_4'$ | $Q_2$ | $Q_2'$ | $Q_8$ | $Q_8'$ | $R_6$ | $R_6'$ |
| $P_5$ | $P_5'$ | $Q_3$ | $Q_3'$ | $R_1$ | $R_1'$ | $R_7$ | $R_7'$ |
| $P_6$ | $P_6'$ | $Q_4$ | $Q_4'$ | $R_2$ | $R_2'$ | $R_8$ | $R_8'$ |

$S_{BP} = S_{BP}'$
$S_{CQ} = S_{CQ}'$
$S_{DR} = S_{DR}'$

This re-arrangement is obtained thanks to a set of gates 841.

FIG. $3_2$ shows the re-arrangement between incoming bi-octets AB, BC, CD, DA, and outgoing octets C', D', A', B'. The re-arrangement is as follows:

| A | B' | B | C' | C | D' | D | A' |
|---|----|---|----|---|----|---|----|
| $P_1$ | $Q_1'$ | $P_7$ | $Q_7'$ | $Q_5$ | $R_5'$ | $R_3$ | $P_3'$ |
| $P_2$ | $Q_2'$ | $P_8$ | $Q_8'$ | $Q_6$ | $R_6'$ | $R_4$ | $P_4'$ |
| $P_3$ | $Q_3'$ | $Q_1$ | $R_1'$ | $Q_7$ | $R_7'$ | $R_5$ | $P_5'$ |
| $P_4$ | $Q_4'$ | $Q_2$ | $R_2'$ | $Q_8$ | $R_8'$ | $R_6$ | $P_6'$ |
|  | C' |  | D' |  | A' |  | B' |
| $P_5$ | $Q_5'$ | $Q_3$ | $R_3'$ | $R_1$ | $P_1'$ | $R_7$ | $P_7'$ |
| $P_6$ | $Q_6'$ | $Q_4$ | $R_4'$ | $R_2$ | $P_2'$ | $R_8$ | $P_8'$ |

$S_{BP} = S_{CQ}'$
$S_{CQ} = S_{DR}'$
$S_{DR} = S_{BP}'$

This re-arrangement is obtained thanks to a set of gates 842.

FIG. $3_3$ shows the re-arrangement between incoming bi-octets AB, BC, CD, DA and outgoing octets D', A', B', C'. The re-arrangement table is shown below:

| A | C' | B | D' | C | A' | D | B' |
|---|----|---|----|---|----|---|----|
| $P_1$ | $R_1'$ | $P_7$ | $R_7'$ | $Q_5$ | $P_5'$ | $R_3$ | $Q_3'$ |
| $P_2$ | $R_2'$ | $P_8$ | $R_8'$ | $Q_6$ | $P_6'$ | $R_4$ | $Q_4'$ |
|  | D' |  | A' |  | B' |  | C' |
| $P_3$ | $R_3'$ | $Q_1$ | $P_1'$ | $Q_7$ | $P_7'$ | $R_5$ | $Q_5'$ |
| $P_4$ | $R_4'$ | $Q_2$ | $P_2'$ | $Q_8$ | $P_8'$ | $R_6$ | $Q_6'$ |
| $P_5$ | $R_5'$ | $Q_3$ | $P_3'$ | $R_1$ | $Q_1'$ | $R_7$ | $Q_7'$ |
| $P_6$ | $R_6'$ | $Q_4$ | $P_4'$ | $R_2$ | $Q_2'$ | $R_8$ | $Q_8'$ |

$S_{BP} = S_{DR}'$
$S_{CQ} = S_{BP}'$
$S_{DR} = S_{CQ}'$

This re-arrangement is obtained thanks to a set of gates 843.

Figure 4A:
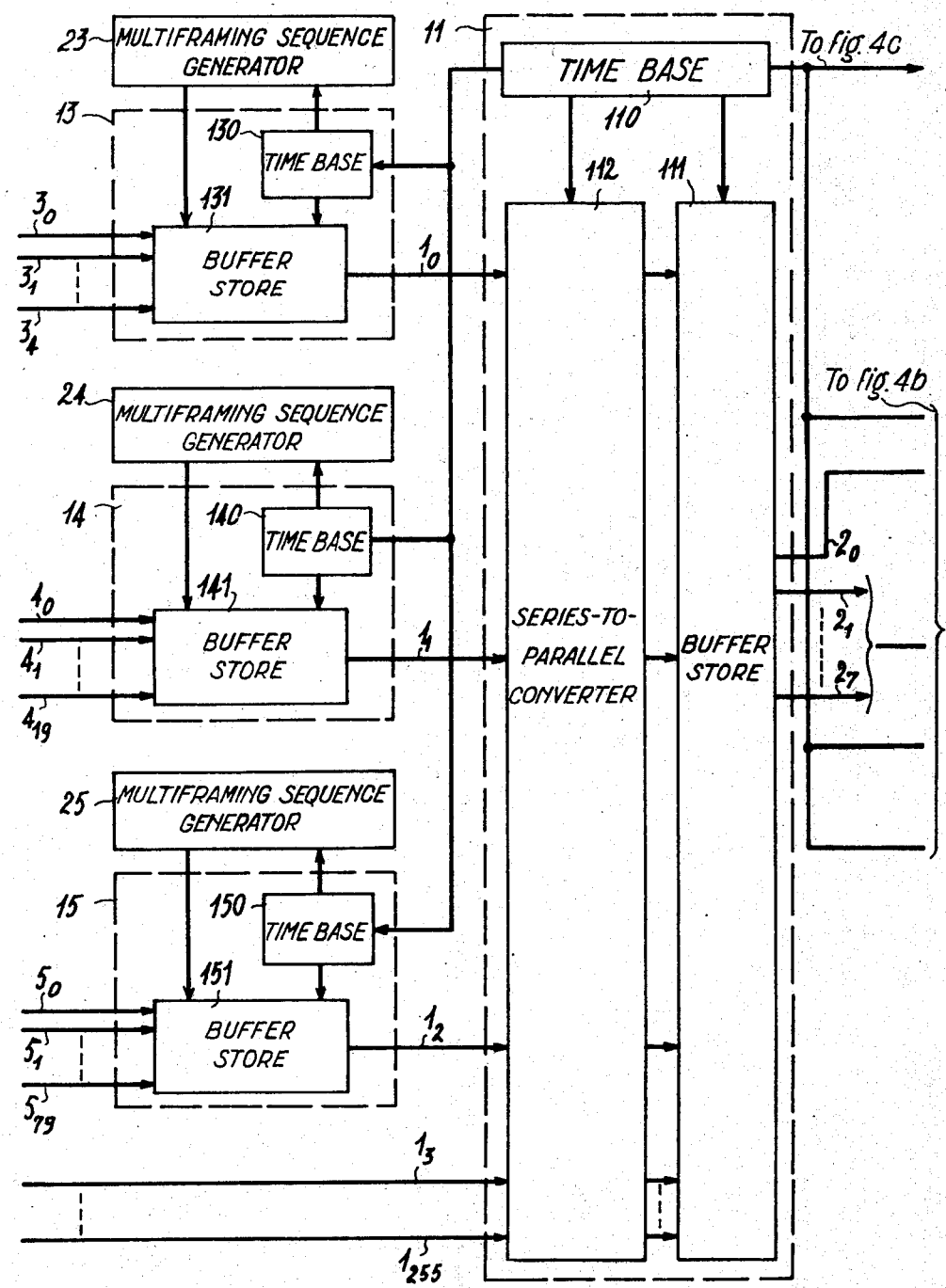
FIG. 4, including 4A through 4C, represents a mono-rate digital switching network for switching words of different formats.

Referring now to FIG. 4a, incoming time-division second-order multiplex channels $1_0$ to $1_{255}$ at an user rate of 64 kbit/s and in which the octets are serially conveyed are multiplexed into 8 parallel multiplex junctions $2_0$ to $2_7$ each at the rate of 2.048 Mbit/s - i.e., where the time slots allotted to the incoming multiplex channels are $125/256 = 0.5$ μs. The 8 multiplex junctions $2_0$ to $2_7$ transmit the bits of the octets in parallel, one bit on each of the junctions.

The second-order incoming channels $1_0$ to $1_{255}$ are composite channels of known type, each having three individual channels, one transmitting 64 kbit/s data, the second transmitting a 64 kHz clock or timing bit signal, and the third transmitting a 8 kHz clock or timing octet signal.

We have assumed on FIG. 4 that the channel $1_0$ resulted from the multiplexing of 5 first-order channels $3_0$ to $3_4$, each at a 12.8 kbits/sec. rate, that channel $1_1$ resulted from the multiplexing of 20 first-order channels $4_0$ to $4_{19}$, each at a 3.2 kbits/sec. rate, and that channel $1_2$ resulted from the multiplexing of 80 first-order channels $5_0$ to $5_{79}$, each at a 0.8 kbit/sec. rate.

The multiplexings of the first-order channels into second-order channels are performed in multiplexers 13, 14, 15 respectively as regards second-order channels $1_0$, $1_1$, $1_2$. The multiplexing of the 256 64 kbit/s channels is performed in a multiplexer 11.

Each multiplexer 13, 14, 15 comprises in known manner a respective time base 130, 140, 150 producing timing pulses at the frequency of the incoming data and timing pulses at the frequency of the outgoing data, and a respective buffer store 131, 141, 151.

The octets are written into the respective store 131, 141, 151 under the control of the timing signals at the frequency of the incoming data; during write-in, the first bit — i.e., the framing bit — is eliminated and replaced by a bit F of the multiframing sequence produced by the multiframing sequence generator 23, 24, 25 respectively. Such generators are known in the art. The earlier patent application hereinbefore alluded to described such a generator, of use for producing an 80-bit pseudorandom multiframing sequence and which can be used without alteration as the generator 23 or 24 or 25 of FIG. 4a.

The multiplexer 11 which multiplexes already multiplexed signals comprises in conventional manner a time base 110, a series-to-parallel converter 112 and a buffer store 111. Time base 110 defines incoming-bit time slots lasting approximately 16 μs and outgoing time slots of 0.5 μs. The incoming bits are in series and an octet lasts for a $16 \times 8 = 125$ μs time slot. The outgoing octets are in parallel and last for a 0.5 μs time slot.

Multiplexer 11 is associated with an octet address computer 40 (FIG. 4b) connected to whichever of the multiplex 2.048 Mbit/s, junctions transmits the first bits of the octets (assumed to be the multiplex junction $2_0$), computer 40 being connected to time base 110. An octet computer of this kind is described in the U.S. Pat. No. 3,952,162 issued Apr. 20, 1976. The octets and their first bits form 256 interlaced sequences.

As already stated, each octet has a two-part address. The first part thereof is between 0 and 255 and is the rank of the octet in the frame of 256 0.5 μs time slots forming the parallel 2.048 Mbit/s multiplex. The first part of the address therefore contains 8 bits. The second part of the address is the channel address in the 320-octet multiframe. The octet address computer 40 is connected to a channel address computer 60. As explained in U.S. Pat. No. 3,952,162 issued Apr. 20, 1976 the channel address computer is a digital divider supplying the remainder of the division of the octet address by a factor equal to 5, 20 or 80 according to whether the first-order channel is of high rate, intermediate rate or low rate.

The first-order channel address ChA supplied by read-only store 60 effects a read-out addressing of the marking store 50 of the data switching network. The latter store contains marking words (MW) which can be selectively directed to the control unit 52 or to the buffer store 53. The marking words comprise a status bit (StB) which is a one or a zero according to the actual state of the communication. In proportion as the communication establishment proceeds, the marking word goes from the marking store to the control unit, where it is modified and sent back to the marking store. It can be said that the processing of connection and disconnection progresses by modification of the marking word. Consequently, the status bit (StB) of the marking word indicates whether the date channel from which an octet is received is in the data-transmitting state or in the signalling state. Further, the marking word contains the address of the correspondent if the channel is being transmitting data, or call-processing bits if the channel is being transmitting signalling in view of connection.

The information octet (IOc), the channel address (ChA) and the marking word (MW) are then transmitted via the bus 51 to the control unit 52. If the phase is one of data transmission (StB=1), the information octet IOc is written into buffer store 53 at the address read-out in the read-only store 60. To this end, the status bit (StB) of the marking word (MW) read-out in store 50 opens gates 54 which connect the multiplex junctions $2_1 - 2_7$ transmitting the last-mentioned octet to the information inputs of the buffer store 53, and gates 55 which connect store 50 to the write-in addressing inputs of store 53.

If the phase is one of signalling transmission (StB=0), a signalling octet (SOc) supplied by control unit 52 is written into the buffer store at the address (ChA) of the incoming channel. To this end, through the agency of inverter 59 which converts the status bit (StB) which is equal to zero into a one, the gates 56 are open by the inverted status bit and connect the control unit to the information inputs of store 53, and gates 57 are also open and connect store 60 to the write-in addressing inputs of store 53.

Summing-up, the octets IOc may be data octets or signalling octets. When the octets IOc are data octets, they are stored in buffer memory 53 through gates 54 at the address of the called party. The called party address is contained in the marking word and is applied to the write-in address inputs of buffer store 53 through gates 55. When the octets IOc are signalling octets, they are sent to control unit 52. This control unit generates signalling octets SOc which are stored in the buffer memory 53 through gates 56 at the address of the calling party. This is to inform the calling party of the processing of the call (calling tone, ringing back tone, etc.). The calling party address is contained in the read-only memory store 60 and is applied to the write-in address inputs of buffer store 53 through gates 57.

Read-out from the buffer store 53 is controlled directly by time base 110. The first bits of the octets written into the buffer store 53 are removed at write-in and are replaced at read-out by the bits F of a pseudo-random multiframing sequence produced by generator 58. Of course, the octets to carry the bits of the multi-framing sequence are the octets of a single 2.048 Mbit/s multiplex channel, e.g. the channel $102_0$. However, since all the 256 64 kbit/s multiplex channels are phase-locked at the output there is no need to apply to the octets the bits of the multiframing sequences in shared time. The first bit of the pseudorandom sequence can be applied to the 256 outgoing second-order multiplex channels of the first frame of the third order channel, the second bit of the sequence can then be applied to the 256 outgoing second-order multiplex channels of the second frame, and so on up to the 320th bit of the sequence. In short, the 256 pseudorandom multiframing sequences of the octets of the frames of the 256 second-order multiplex channels are out of phase in the case of the incoming second-order multiplex channels and in phase in the case of the outgoing second-order multiplex channels.

The octets with their multiframing sequence bits and appearing in parallel on the 2.048 Mbit/s third-order multiplex junctions $102_0$ to $102_7$ are applied to a multiplex demultiplexer 11' which converts the eight 2.048 Mbit/s parallel multiplexed channels $102_0$ to $102_7$ into 256 serial 64 kbit/s multiplexed channels $101_0$ to $101_{255}$. The demultiplexer 11' shares the time base 110 with the miltiplexer 11 and has a parallel-to-series converter 112' and a buffer store 111'.

Figure 4B:
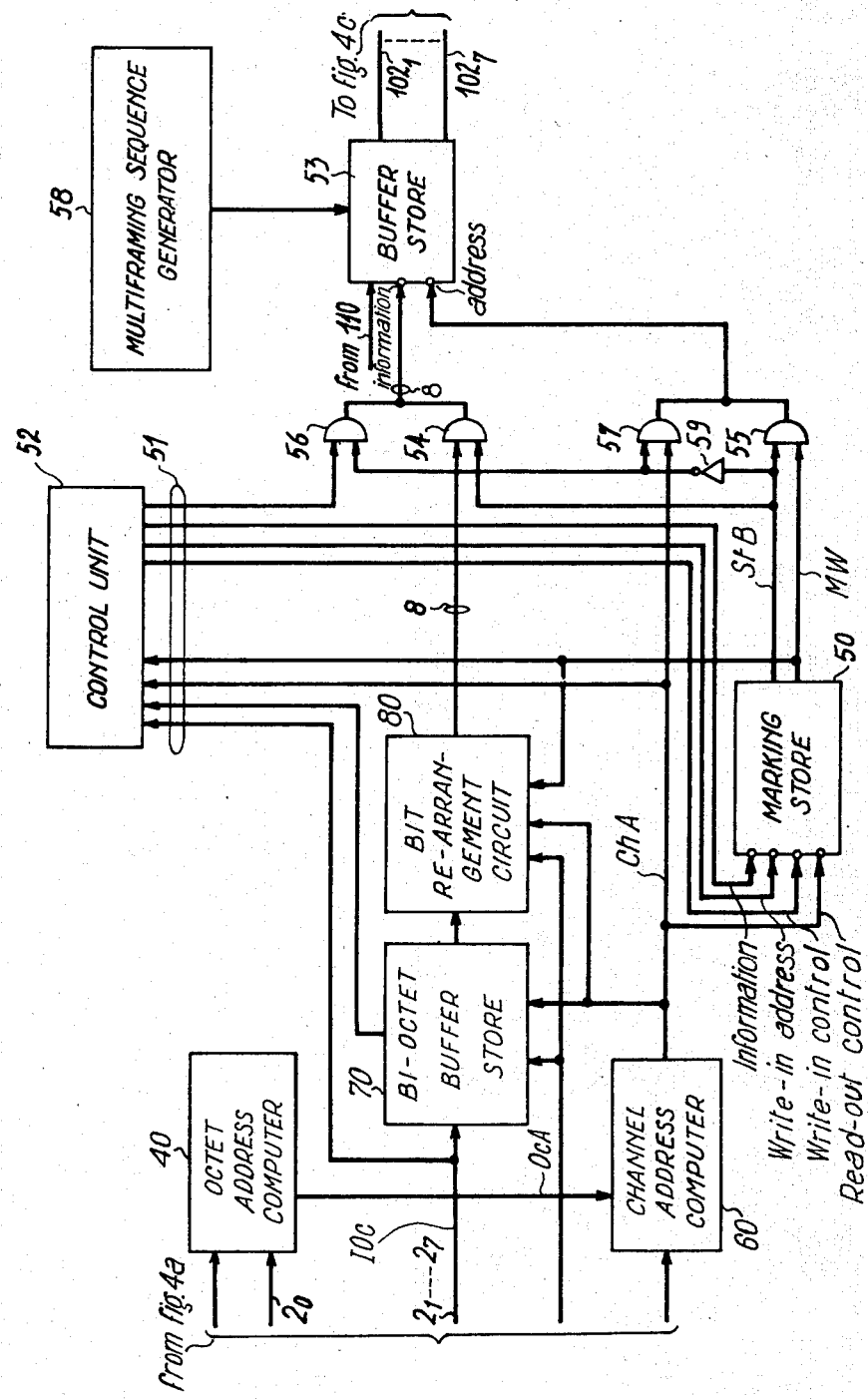
Figure 4C:
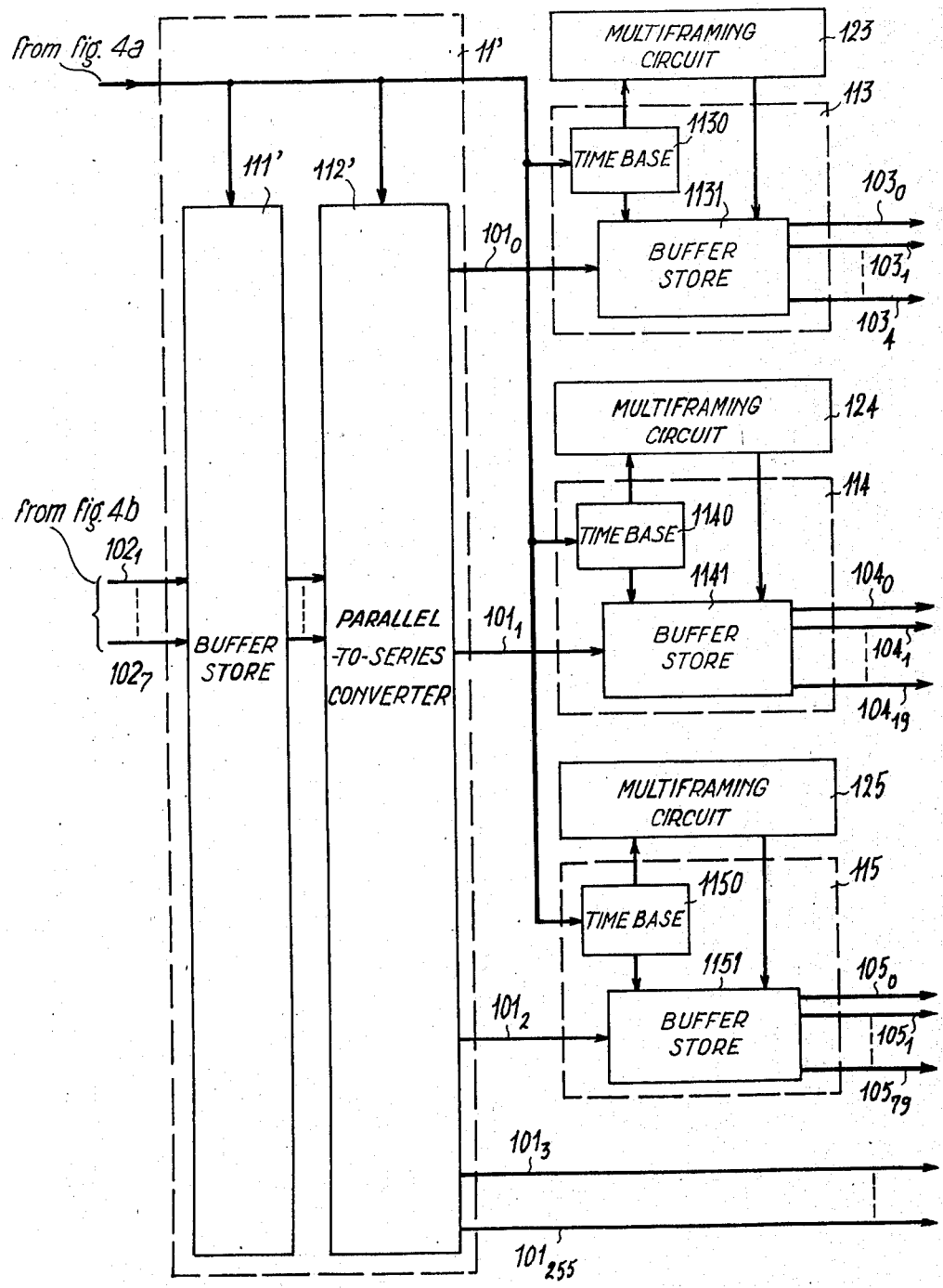

By symmetry with FIG. 4a, it has been assumed in FIG. 4c that the multiplex channel $101_0$ was demultiplexed into five 12.8 kbits/s. channels $103_0$ to $103_4$ in demultiplexer 113, that the multiplex channel $101_1$ was demultiplexed into twenty 3.2 kbits/s. channels $104_0$ to $104_{19}$ in demultiplexer 114 and that multiplex channel $101_2$ was demultiplexed into eighty 0.8 kbit/s. channels $105_0$ to $105_{79}$ in demultiplexer 115.

Each of the demultiplexers 113, 114, 115 has a respective time base 1130, 1140, 1150 and a respective buffer store 1131, 1141, 1151. Associated with each demultiplexer 113, 114, 115 is a multiframe recovering circuit 123, 124, 125 respectively of the kind described in U.S. Pat. No. 3,952,162 issued Apr. 20, 1976. The output of the transcoder of the multiframe recovering circuit is used as a register for addressing the demultiplexer buffer store.

Up to now, the switching network which has been described in relation to FIGS. 4a, 4b and 4c did not differ from that which has been disclosed in U.S. Pat. No. 3,952,162 issued Apr. 20, 1976. Pursuant to the invention, a bi-octet buffer store 70 receives, in parallel, the octets arriving over the third order multiplex junctions $2_1$ to $2_7$. This buffer store is addressed for writing-in by means of the first order channel address computer 60. The buffer store 70 contains registers 701, 702 and 703, as already mentioned in relation to FIG. 2.

Figure 5:
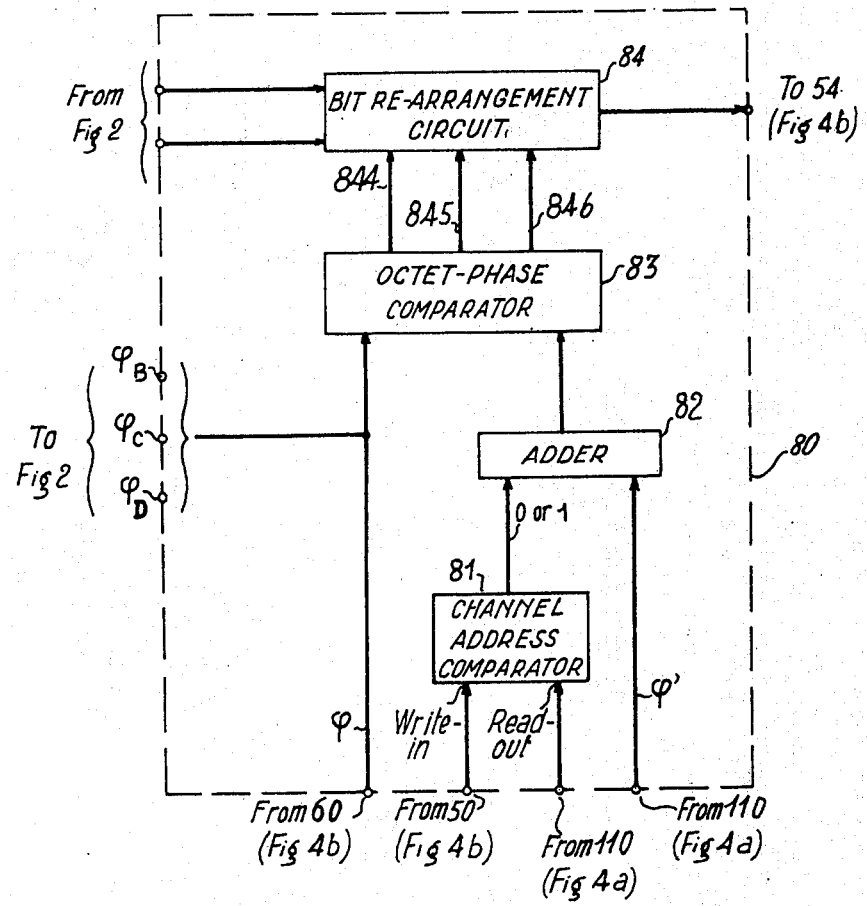
FIG. 5 depicts the re-arranging circuit of the envelope bits of the FIG. 4 switching network.

The consecutive octets stored in registers 701 and 702 are applied to an envelope bit re-arrangement circuit 80. This circuit receives from the marking store 50 and through terminal 801 the write-in address of the channel in the buffer store 53 and from time base 110 and through terminal 802 the read-out address of the channel from the buffer store 53. Circuit 80 also receives through terminal 803 phase $\phi'_A$, $\phi_B$, $\phi_C$, or $\phi_D$ of the incoming octet provided by the address computer of channels 60 and through terminal 804 phase $\phi'_A$, $\phi'_B$, $\phi'_C$, or $\phi'_D$ of the outgoing octet provided by time base 110. Write-in addresses and read addresses of channels are compared (FIG. 5) in a channel address comparator 81 which provides a one a zero depending on whether the channel read address is larger or smaller than its write-in address. In fact, in the last case, the octet of the channel will be read in the next frame only. Comparator 81 output signal is added to phase $\phi'$ of outgoing octet in adder 82. Thus, this adder provides the outgoing octet phase which is $\phi'$ if the octet is read out in the actual frame or $(\phi' + 1)$ if the octet is read out in the next frame due to the fact that its read out address is smaller than its write-in address. This outgoing octet phase is compared to phase $\phi$ of the incoming octet in the phase comparator 83 which generates a signal $(\phi - \phi')$ modulo 4. Comparator 83 controls the envelope re-arranging circuit 84 which contains gate groups 841, 842, 843, already mentioned in connection with FIGS. $3_1$, $3_2$ and $3_3$, which are controlled by wires 844, 845, and 846, respectively.

The envelope bits re-arrangement circuit 84 output is linked to gate 54 on FIG. 4b.

Figure 6A:
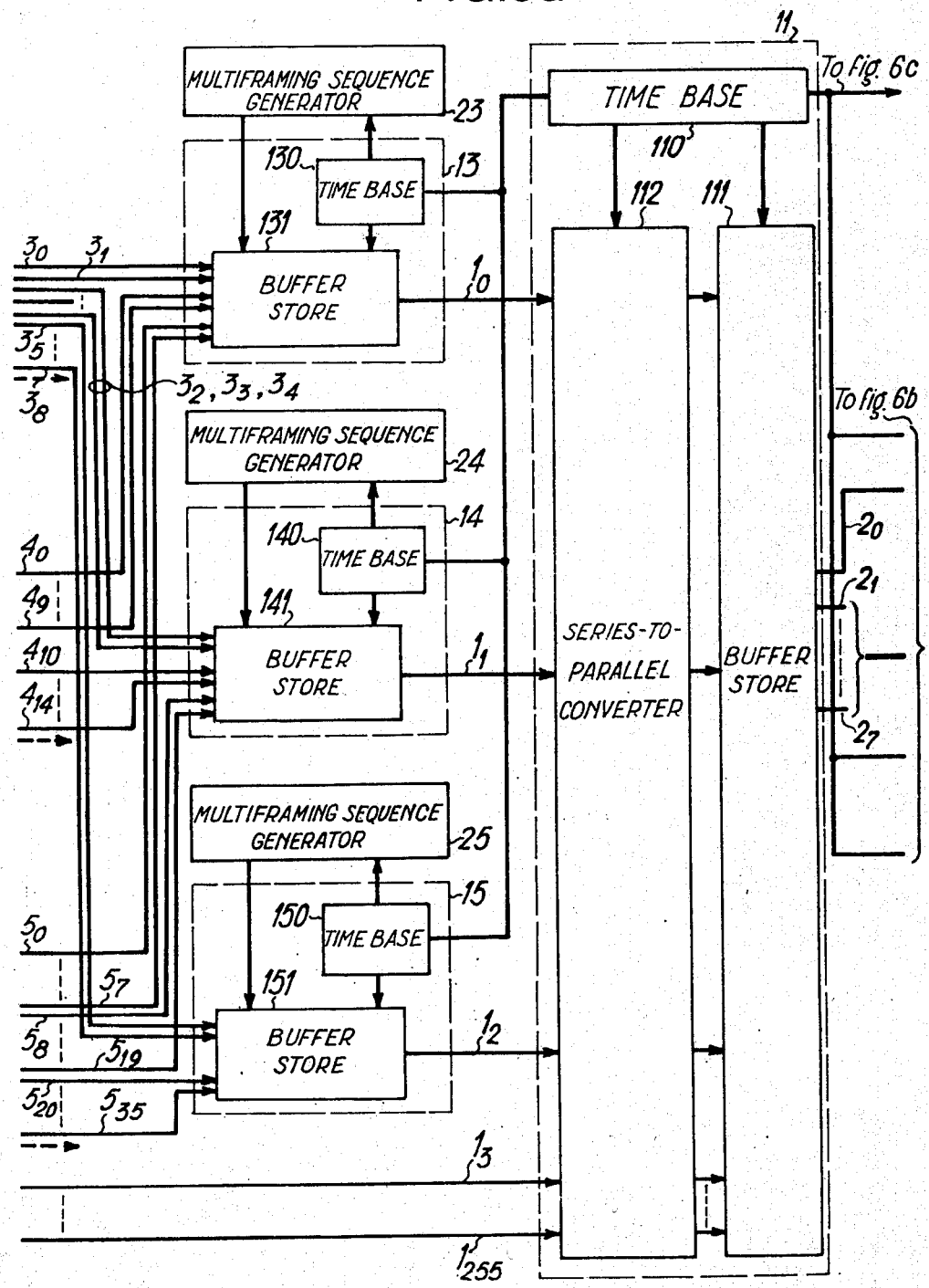
FIG. 6, including 6A through 6C, represents a multi-rate digital switching network switching words of different formats.
Figure 6B:
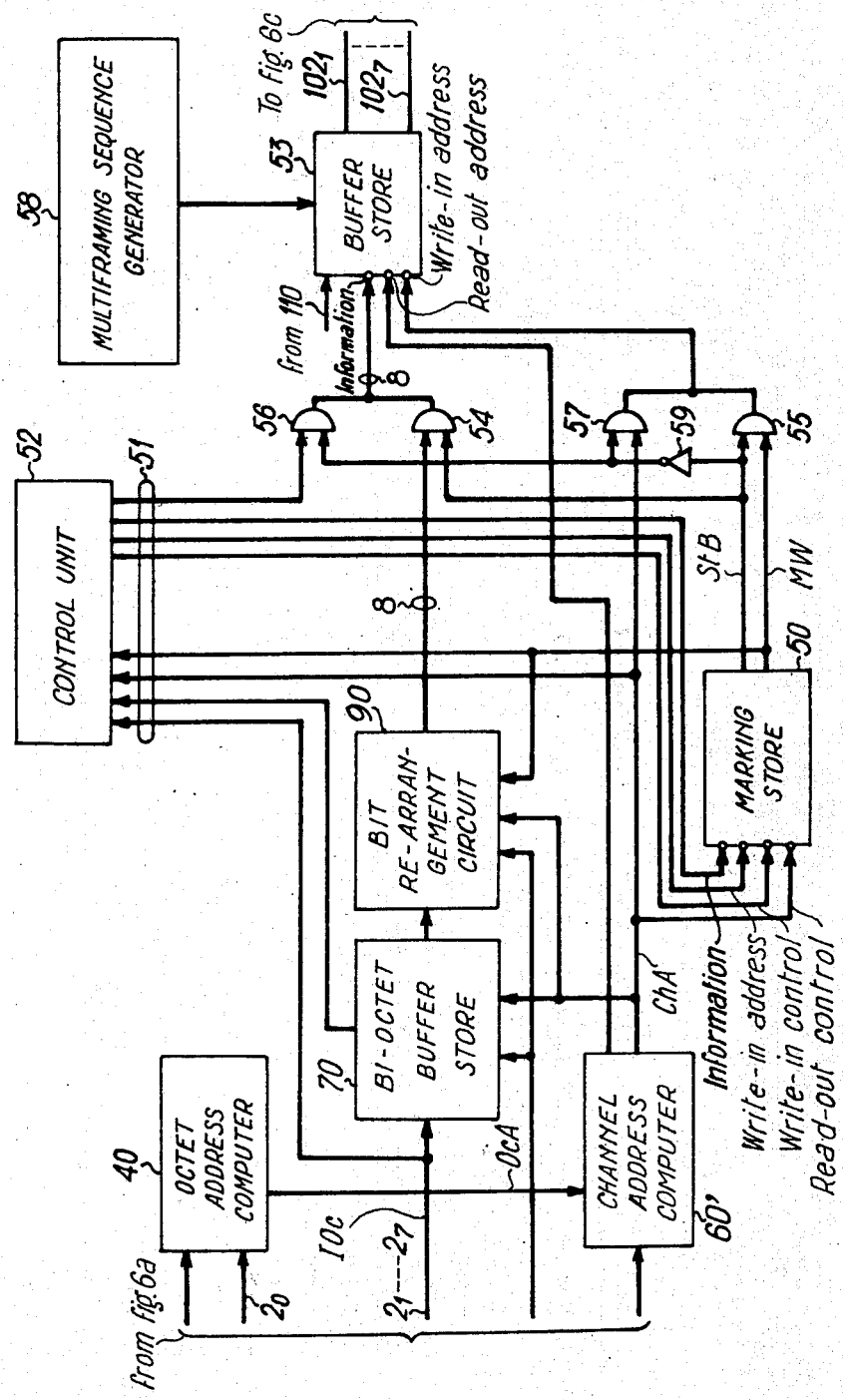
Figure 6C:
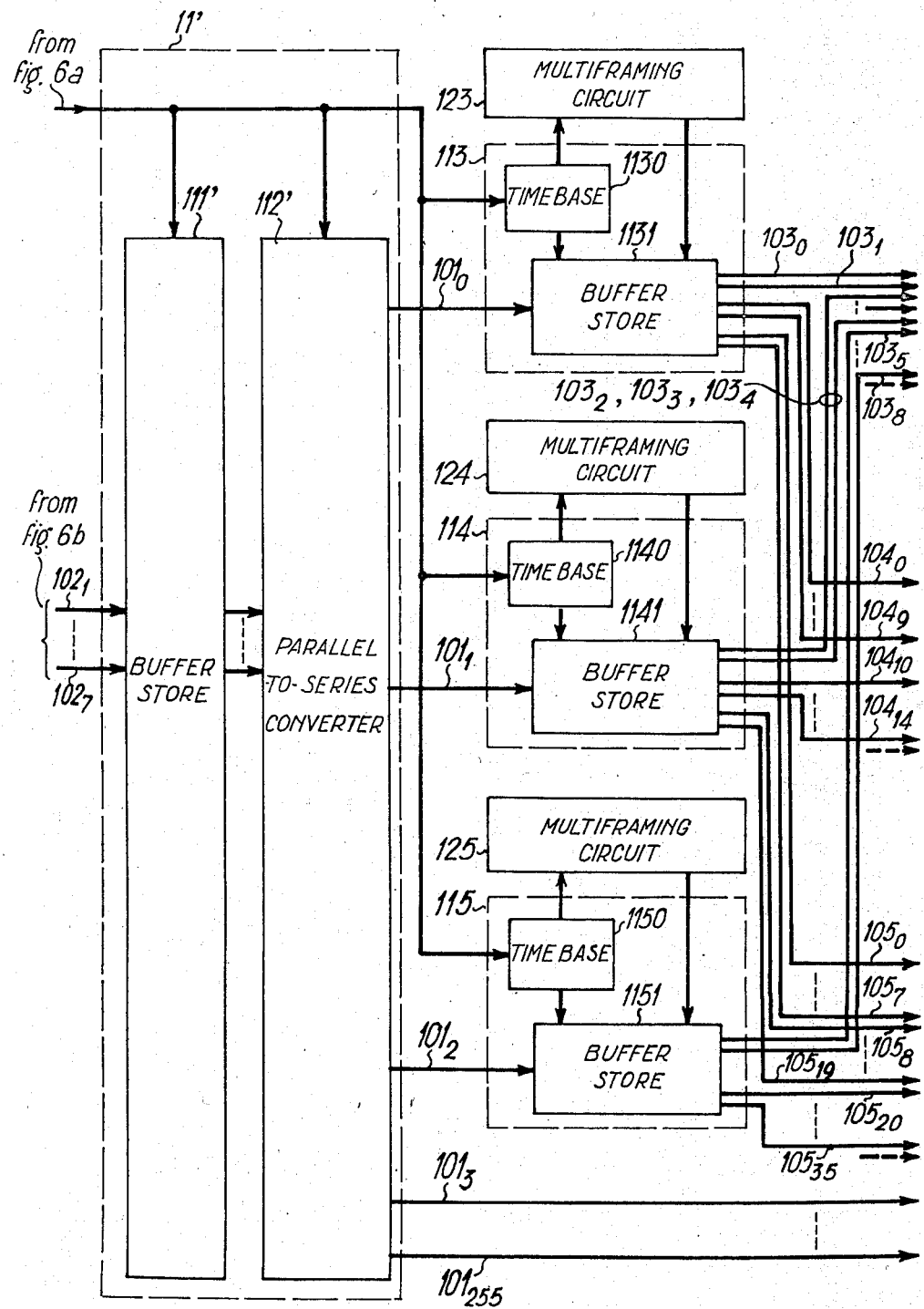

Now, referring to FIGS. 6a, 6b and 6c, we see that these Figures do not differ from FIGS. 4a, 4b and 4c, except for the fact that the second order mutiplex channels are not homogeneous and that a same channel of second order can include $x$ channels of the first order at a rate of 12.8 kbits/sec., $y$ channels of the first order at a rate of 3.2 kbits/sec., and $z$ channels of the first order at a rate of 0.8 kbit/sec. The channel address computer 60' is not a simple octet address divider as with 60, but a read-only memory acting to effect a correlation between an octet address and a channel address in function of the multiplexing schedule. The switching network on FIGS. 6a, 6b, 6c has been described in U.S. Pat. application Ser. No. 645,237, filed Dec. 29, 1975.

As it has been explored in the last-mentioned Patent application, a first-order channel computer which assumes to be a read-only memory addressed by an octet address computer, enables to derive from the full octet address (first portion of the address comprised between 0 and 255 and second portion of address between 0 and 79) the first order channel address of the given octet. In the present invention, due to the quadri-octet locking, the multiframe contains 320 octets from 0 to 319 instead of 80. Let us take into consideration a first channel of the second order resulting from the multiplexing of $x = 2$ first order channels at high rate, $y = 10$ channels of the first order at intermediate rate, and $z = 8$ channels of the first order at low rate, therefore a total of $x + y + z = 20$ first order channels, and let us assume that this second order channel is the channel 21 in the entering multiplex of the third order. Let us also take into consideration a second channel of the second order resulting from the multiplexing of $x' = 1$ channel of the first order at a high rate, $y' = 2$ channels of the first order at intermediate rate, and $z' = 56$ channels of the first order at low rate, therefore a total of $x' + y' + z$ $' = 59$, and let us assume that this channel of the second order is channel 203 in the multiplex of the third order.

Octets of channel 21 of the second order may be written as:

Octets at high rate:

$W_{21,(X+5k_x)}$ where X (number of the channel among the $x$ channels) designates 2 numbers between 0 and 4, for instance 0 and 4 and $0 \leq k_x \leq 63$ Octets at intermediate rate:

$W_{21,(Y+20k_y)}$ where Y (number of the channel among the y channels) designates 10 numbers between 0 and 19, for instance, 1, 3, 5, 7, 9, 11, 13, 15, 17, 18, and $0 \leq k_y \leq 15$.

Octets at low rate:

$W_{21,(Z+80k_z)}$ where Z (number of the channel among the z channels) designates 8 numbers between 0 and 19, for instance 2, 6, 8, 10, 12, 14, 16, 19, and $0 \leq k_z \leq 3$. Octets of channel 203 of the second order may be written as:

Octets at high rate:

$W'_{203,(X'+5k_{x'})}$ where X' (number of the channel among the $x'$ channels) designates 1 number between 0 and 4, for instance 2.

Octets at intermediate rate:

$W'_{203,(Y'+20k_{y'})}$ where Y' (number of the channel among the y' channels) designates 2 numbers between 0 and 19, for instance 7 and 17.

Octets at low rate:

$W'_{203,(Z'+20k_{z'})}$ where Z' (number of the channel among the z' channels) designates 56 numbers between 0 and 58, that is all the numbers. 0–58 except 2, 7 and 17.

A third order frame comprises $320 \times 256$ octets. As it is well known in the digital switching art, when the reading out address of an octet is smaller than its writing in address, the octet is read out during the frame following its writing in frame. In this case, the phase of the read out octet must be incremented by a unity.

EXAMPLE NO. 1

Let us assume that the incoming channel is the high rate first-order channel X=4 multiplexed in the second-order channel No. 21 and that the outgoing channel is the high rate first-order channel X'=2 multiplexed in the second-order channel No. 203. In the incoming second-order channel No. 21, the octets of the first-order channel X=4 carry addresses:

4 (octet A)
9 (octet B)
14 (octet C)
19 (octet D)
24 (octet A)
. . . . . . . . . . .
314 (octet C)
319 (octet D)

In the outgoing second-order channel No. 203, the octets of the first order channel X'=2 carry addresses 2 (octet A)
7 (octet B)
12 (octet C)
17 (octet D)
22 (octet A)
. . . . . . . . . . .
312 (octet C)
317 (octet D)

EXAMPLE NO. 2

Let us assume that the incoming channel is the high rate first order channel X=2 multiplexed in the second-order channel No. 203 and that the outgoing channel is the high rate first-order channel X'=4 multiplexed in the second-order channel No. 21. The channels considered are the same as in Example No. 1 but their function, incoming or outgoing, have been interchanged.

EXAMPLE NO. 3

Let us now assume that the incoming channel is the intermediate rate first-order channel Y=17 multiplexed in the second-order channel No. 203 and that the outgoing channel is the intermediate rate first-order channel Y'=7 multiplexed in the second-order channel No. 203. In the incoming second-order channel No. 203, the octets of the first-order channel Y=17 carry addresses:

17 (octet A)
37 (octet B)
57 (octet C)
77 (octet D)
97 (octet A)
. . . . . . . . . . .
297 (octet C)
317 (octet D)

In the outgoing second-order channel No. 203, the octets of the first-order channel Y'=7 carry addresses:

7 (octet A)
27 (octet B)
47 (octet C)
67 (octet D)
87 (octet A)
. . . . . . . . . . .
287 (octet C)
307 octet D)

In the given examples, the writing in and reading out addresses comprises a second-order channel number $W_{2W}$ (writing in) and $W_{2R}$ (reading out) and an octet address in the multiframe $W_{1W}$ (writing in) and $W_{1R}$ (reading out)

|  | $W_{2W} + W_{1W}$ | $W_{2R} + W_{1R}$ |
| --- | --- | --- |
| Example No. 1 | $(320\times21)+4+5k_x$ | $(320\times203)+2+5k_x$ |
| Example No. 2 | $(320\times203)+2+5k_x$ | $(320\times21)+4+5k_x$ |
| Example No. 3 | $(320\times203)+17+20k_y$ | $(320\times203)+7+20k_y$ |

The non-bracketed part of the addresses, $W_{1W}$ or $W_{1R}$, is always smaller than 320. It results that when the numbers of the second-order channels, $W_{2W}$ and $W_{2R}$, are different, it is sufficient to compare these addresses in order to know which of the writing in address or the reading out address of an octet is the higher. Only in the case where $W_{2W}$ and $W_{2R}$ are equal the first-order addresses $W_{1W}$ and $W_{1R}$ have to be compared therebetween.

Figure 7:
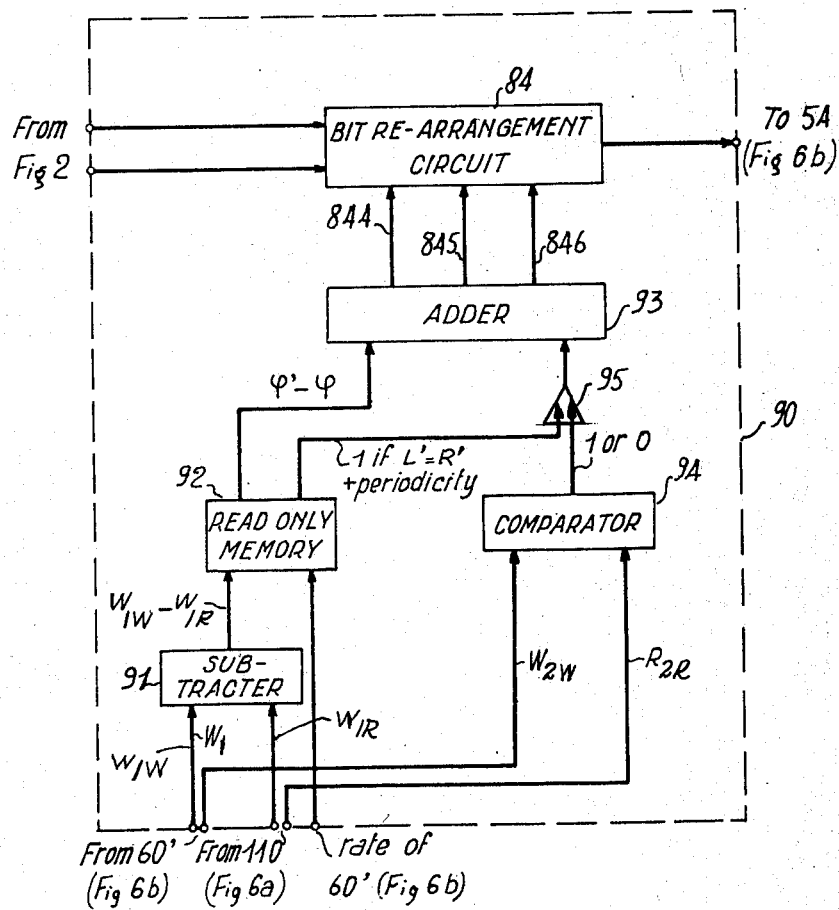
FIG. 7 represents the re-arranging circuit of the envelope bits of the FIG. 6 switching network.

Turning now to FIG. 7, it represents the enveloppe bit re-arrangement circuit 90 in the case of a multirate switching network.

Read only memory 60' provides the re-arrangement circuit 90 with the address of the first octet in the incoming third-order channel. $W_{1W}$ is applied to subtracter 91 and $W_{2W}$ is applied to comparator 94. Circuit 90 receives from time base 110 the address of the first octet in the outgoing third-order channel. $W_{1R}$ is applied to subtracter 91 and $W_{2R}$ is applied to comparator 94. The quantity $(W_{1W}-W_{1R})$ is formed by subtracter 91 and is applied as an address to the read only memory 92 which also receives from read only memory 60' the channel rate in the form of a two bit information and provides the phase shift $(\phi-\phi')$ to an adder 93. Comparator 94 delivers a zero when $W_{2W}$ is smaler than $W_{2R}$ and a one when $W_{2W}$ is higher than $W_{2R}$. This eventual one is added to the phase shift provided by the read only memory 92 through OR gate 95.

Further, since the buffer store of the switching network cannot be written in and read out simultaneously, a one is also applied to OR gate 95 when $W_{1W} = W_{1R} + T$, where T is $5k_x$ ou $20k_y$ or $80k_z$. Therefore, if the phase shift between the write in octet and the read out octet must be increased by one unity, a one is added to the phase shift in adder 93. The bit re-arrangement circuit in FIG. 7 is the same as that of reference numeral 84 in FIG. 5 and it is controlled by one of the three wires 844, 845, 846 depending on whether the phase shift is 0 or 3; 1; or 2.

What we claim is:

1. A multirate time-division digital switching network comprising:

first multiplexing means in which first-order digital data channels transmitting words having a first and a second formats which are different from, but multiples of, a given format and first rates which are different from, but multiples of, one another are given a first multiplexing converting them into second-order digital data channels having a second predetermined rate, said second format words being formed by a predetermined sequence of first format words;

second multiplexing means in which said second-order digital channels are given a second multiplexing converting them into third-order digital data channels having a third predetermined rate:

a digital switching unit having at least one buffer store in which the first format words of the first-order channels multiplexed into the third-order channels are grouped at a resultant address having first and second part, whose first part is the address of the second-order channel containing the first format word of the first-order channel in the third-order channel and whose second part is the address of the first-order channel in the second-order channel;

means for inserting, in each of the first format words of a second-order channel, bits forming a pseudo-random sequence having a known period so that the bits of a given rank of the words of a third-order channel form a number of interleaved pseudorandom sequences;

means for separating said pseudorandom sequences and for deriving therefrom the addresses of the first format words in the second-order channels;

means for deriving from said addresses of the first format words the addresses of the first order channels;

means for deriving from the addresses of the first format words additional addresses significative of the serial number of the first format word in the second format word forming sequence; and means for re-arranging the first format words in the second format word forming sequence according to their additional addresses.

2. A multirate time division switching network according to claim 1 in which the second-order channels each contain first-order channels of one and the same first rate, further comprising an address dividing circuit receiving the addresses of the words in the second order channels and supplying first order channel addresses equal to the remainder of the division of said word addresses by the number of first order channels of a given rate in a second-order channel.

3. A multirate time division switching network according to claim 1 in which the second-order channels each contain first order channels of at least two different first rates in accordance with multiplexing schedules which can differ for each second-order multiplex channel, further comprising a read only store addressed by the addresses of the words in the second-order channels and supplying the first-order channel addresses associated with said word addresses in the second-order channels according to said multiplexing schedules.

4. A multirate time division switching network according to claim 1 in which the first format words are octets and the second format words are quadri-octets.

* * * * *